J. LUND.
Velocipede.
No. 91,550.
Patented June 22, 1869.
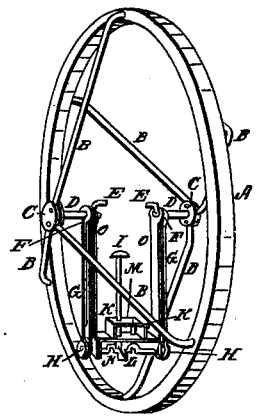
Fig. 1.
Fig. 3.
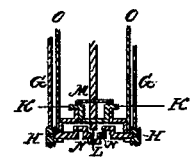
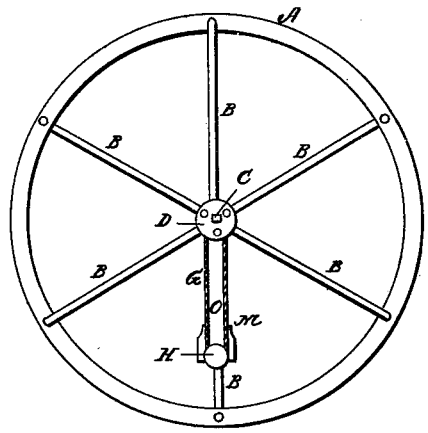
Fig. 2.
Witnesses:
J. B. Smith
W. M. Hornor
Inventor:
John Lund

United States Patent Office.

JOHN LUND, OF MILWAUKEE, WISCONSIN.

Letters Patent No. 91,550, dated June 22, 1869.

---

IMPROVEMENT IN VELOCIPEDES.

---

The Schedule referred to in these Letters Patent and making part of the same.

---

*To all whom it may concern:*

Be it known that I, JOHN LUND, of the city and county of Milwaukee, and State of Wisconsin, have invented a new and useful Improvement in One-Wheel Velocipedes; and I do hereby declare that the following is a full, clear, and exact description thereof, which will enable those skilled in the art to make and use the same, reference being had to the accompanying drawing, forming part of this specification, in which—

Figure 1 is a perspective view of my invention.
Figure 2, a side view.
Figure 3, a sectional view of the propelling-works.

Similar letters of reference, in each of the figures, indicate corresponding parts.

The nature of my invention consists in producing a velocipede with one wheel, simple, easy of construction, and easily propelled.

A is the rim of the wheel.
B, the spokes, bent out, so that the operating-works can pass between them.
C C, hubs.
D D, axles.
E E, cranks on the shafts.
F F, pulleys on the main shaft.
G G, bands.
H H, pulleys on the lower crank-shaft.
I, seat, its lower end made like a knife, resting on the centre lower crank.
K K, foot-rests, their lower ends made like seat I, resting on the two outside lower cranks.
L, lower end of seat.
M, platform.
N N N, lower cranks.
O O, side hangers, supporting the lower crank-shaft, platform, &c.

Operation.

Step on to the platform M, sit down on seat I, and place your feet on foot-rests K K. Take hold of cranks E E, and turn on said cranks E E; this will revolve wheel A. Seat I, with its lower end resting on the centre crank, with a long knife-like bottom, so as to rest on the crank its whole revolution, and the foot-rests resting on the outer cranks, with similar bottoms to that of the seat I, a gentle motion of the body up and down, will revolve the cranks, and convey motion to the wheel A, by the bands G G, and wheel A will revolve with great velocity.

What I claim as my invention, and desire to secure by Letters Patent, is—

1. Seat I, cranks N N N, foot-rests K K, bands G G, in combination with pulleys F and H, and shafts D D, and wheel A, substantially as described.

2. Wheel A, spokes B, hubs C, and shafts D, in combination with hanger O, and cranks E, constructed and arranged substantially as described.

3. Foot-rests K K and seat I, resting on cranks N, with long feet, substantially as described.

JOHN LUND.

Witnesses:
J. B. SMITH,
W. M. HOWSON.